United States Patent
Sappey

(10) Patent No.: US 6,421,481 B1
(45) Date of Patent: Jul. 16, 2002

(54) APPARATUS AND METHOD FOR PRODUCING A FLAT-TOPPED FILTER RESPONSE FOR DIFFRACTION GRATING (DE) MULTIPLEXER

(75) Inventor: Andrew D. Sappey, Lakewood, CO (US)

(73) Assignee: Zolo Technologies, Inc., Louisville, CO (US)

( * ) Notice: Subject to any disclaimer, the term of this patent is extended or adjusted under 35 U.S.C. 154(b) by 0 days.

(21) Appl. No.: 09/675,276

(22) Filed: Sep. 29, 2000

Related U.S. Application Data

(63) Continuation-in-part of application No. PCT/US00/23898, filed on Aug. 31, 2000, which is a continuation-in-part of application No. 09/628,774, filed on Jul. 29, 2000.
(60) Provisional application No. 60/213,197, filed on Jun. 21, 2000, provisional application No. 60/199,693, filed on Apr. 26, 2000, and provisional application No. 60/180,341, filed on Feb. 4, 2000.

(51) Int. Cl.[7] .................................................. G02B 6/34
(52) U.S. Cl. .............................. 385/37; 385/10; 385/24
(58) Field of Search .............................. 385/37, 33, 24, 385/46, 31, 14, 10, 15; 359/130, 131, 124, 127

(56) References Cited

U.S. PATENT DOCUMENTS

| | | |
|---|---|---|
| 5,002,350 A | 3/1991 | Dragone |
| 5,136,671 A | 8/1992 | Dragone |
| 5,412,744 A | 5/1995 | Dragone |
| 5,467,418 A | 11/1995 | Dragone |
| 5,488,680 A | 1/1996 | Dragone |
| 5,629,992 A | 5/1997 | Amersfoort et al. |
| 5,852,505 A | 12/1998 | Li |
| 5,861,981 A | 1/1999 | Jabr |
| 5,940,555 A | 8/1999 | Inaba et al. |
| 5,999,290 A | 12/1999 | Li |
| 6,014,482 A | 1/2000 | Laude |
| 6,049,640 A | 4/2000 | Doerr |
| 6,049,644 A | 4/2000 | Dragone |
| 6,069,990 A | 5/2000 | Okawa et al. |
| 6,072,927 A | 6/2000 | Iwashima et al. |
| 6,084,695 A | 7/2000 | Martin et al. |
| 6,137,930 A | 10/2000 | Laughlin |
| 6,141,152 A | 10/2000 | Trouchet |
| 6,160,933 A | 12/2000 | Laude |

FOREIGN PATENT DOCUMENTS

| | | |
|---|---|---|
| EP | 1052530 A2 | 11/2000 |
| GB | 2213954 A | 8/1989 |
| GB | 2219869 A | 12/1989 |

OTHER PUBLICATIONS

Adolf W. Lohmann, "Image formation of dilute arrays for optical information processing", Optics Communications, 86, (1991), pp. 365–370.

D.R. Wisely, "Channel WDM Multiplexer with 1nm Channel Spacing and 0°7nm Brandwidth", Electronics Letters, Mar. 14, 1991, vol. 27, No. 6, pp. 520–521.

*Primary Examiner*—Phan T. H. Palmer
(74) *Attorney, Agent, or Firm*—Swanson & Bratschun LLC

(57) ABSTRACT

A (de)multiplexer for use in optical communications systems includes a diffraction grating optically coupled between a multiplex optical waveguide and a plurality of single channel optical waveguides for diffracting an optical signal between a receiving/transmitting end of the multiplex optical waveguide and a receiving/transmitting end of the single channel optical waveguide. The diffraction grating has al least two surfaces optically coupled to the waveguides. Each of the surfaces is angularly displaced relative to one another a select amount such that a portion of the optical signal diffracted by each surface is offset the direction of dispersion relative to the portions of the optical signal diffracted by the other surfaces to broaden the transmission band. A method for broadening The transmission band of a (de)multiplexer includes dividing the diffraction grating into distinct surfaces and angularly displacing the surfaces relative to one another a select amount such that a portion of the optical signal diffracted by each surface is offset in a direction of dispersion.

20 Claims, 13 Drawing Sheets

APPARATUS AND METHOD FOR PRODUCING A FLAT-TOPPED FILTER RESPONSE FOR DIFFRACTION GRATING (DE) MULTIPLEXER

RELATED APPLICATIONS

This application is a continuation-in-part of U.S. application Ser. No. 09/628,774, filed on Jul. 29, 2000, entitled "Echelle Grating Dense Wavelength Division Multiplexer/Demultiplexer" and PCT Application Ser. No. PCT/US00/23898, filed on Aug. 31, 2000, designating the United States, entitled "Echelle Grating Dense Wavelength Division Multiplexer/Demultiplexer." This application also claims priority from U.S. Provisional Application Ser. No. 60/199,693, filed Apr. 26, 2000, entitled "Production of a Flat-topped Filter Response for a Dense Wavelength Division (De)multiplexer Based on Bulk Diffraction Gratings," U.S. Provisional Application Ser. No. 60/213,197 filed Jun. 21, 2000, entitled "Production of a Flat-topped Filter Response for a Dense Wavelength Division (De)multiplexer Based on Bulk Diffraction Gratings," and U.S. Provisional Application Ser. No. 60/180,341, filed Feb. 4, 2000, entitled "Antenna and Waveguide Array for Efficiently Coupling De-multiplexed Light from a DWDM Device into an Array of Receiver Fibers." Each of these applications is incorporated herein by reference in its entirety.

TECHNICAL FIELD

The present invention is directed toward optical communications, and more particularly toward a bulk optical grating multiplexer/demultiplexer having a flat-topped filter response and a grating for producing a flat-topped filter response.

BACKGROUND ART

At the inception of fiber optic communications, typically a fiber was used to carry a single channel of data at a single wavelength. Dense wavelength division multiplexing (DWDM) enables multiple channels at distinct wavelengths within a given wavelength band to be sent over a single mode fiber, thus greatly expanding the volume of data that can be transmitted per optical fiber. The wavelength of each channel is selected so that the channels do not interfere with each other and the transmission losses to the fiber are minimized. Typical DWDM allows up to 40 channels to be simultaneously transmitted by a fiber.

DWDM requires two conceptually symmetric devices: a multiplexer and a demultiplexer. A multiplexer takes multiple beams or channels of light, each at a discrete wavelength and from a discrete source and combines the channels into a single multi-channel or polychromatic beam. The input typically is a linear array of waveguides such as a linear array of optical fibers, a linear array of laser diodes or some other optical source. The output is typically a single waveguide such as an optical fiber. A demultiplexer spacially separates a polychromatic beam into separate channels according to wavelength. Input is typically a single input fiber and the output is typically a linear array of waveguides such as optical fibers or a linear array of photodetectors.

In order to meet the requirements of DWDM, multiplexers and demultiplexers require certain inherent features. First, dispersive devices must be able to provide for a high angular dispersion of closely spaced channels so that individual channels can be separated over relatively short distances sufficiently to couple with a linear array of outputs such as output fibers. Furthermore, the multiplexer/demultiplexer must be able to accommodate channels over a free spectral range commensurate with fiber optic communications bandwidth. Moreover, the devices must provide high resolution to minimize cross talk and must further be highly efficient to minimize signal loss. In addition, a single device is preferably reversible so it can function as both a multiplexer and a demultiplexer (hereinafter, a "(de) multiplexer"). The ideal device would also be small, durable, inexpensive and scalable.

Diffraction grating based (de)multiplexers have significant advantages over other technologies for dense wavelength division multiplexing applications because of their relatively low cost, high yield, low insertion loss and crosstalk, uniformity of loss as well as their ability to multiplex a large number of channels concurrently. However, grating-based (de)multiplexers typically have a Gaussian filter function. For long-haul fiber networks with large numbers of (de)multiplexers cascaded in series, slight variations in the exact wavelength position of the filter band-pass can cause a significant overall narrowing of the filter function, ultimately leading to large insertion loss. For smaller metro networks, it is not necessary to cascade large numbers of (de)multiplexers in series. However, deployment of metro network equipment is extremely cost sensitive, and a Gaussian filter function requires that the wavelength of the emitting lasers be locked to a particular wavelength with tight precision. But lasers tend to drift for a number of reasons, including variation in ambient temperature and aging. Providing improved lasers adds significant cost to the network equipment. A flat-topped filter response places much less stringent requirements on the tolerance for the laser wavelength. Thus, for both long-haul and metro applications, it is desirable to produce a low-cost (de) multiplexer with a flat-topped filter function.

A number of alternatives have been proposed for adapting grating based (de)multiplexers to provide a more flat-topped filter function. One solution, used with planar waveguide arrays, is the use of a flared or parabolic waveguide input. Such structures are shown in Okawa, U.S. Pat. No. 6,069,990, and Dragone, U.S. Pat. No. 5,002,350. A similar solution has been taught for (de)multiplexers using bulk optical gratings. Finegan, U.K Patent No. GB 2,219,869, teaches a waveguide coupling device having an array of first optical waveguides for carrying optical channels with different wavelengths and a second optical waveguide for carrying a wavelength division multiplex of the optical channels. A diffraction grating is provided between the waveguides to couple channels between the respective first and second waveguides. Each waveguide is provided with an expanded tapered core which effectively widens or broadens the filter function of the (de)multiplexer. Finegan teaches that the fiber core and surrounding cladding may be made of silica with the cladding region doped with flourine or the core region doped with Ge. Heating of the fiber can cause dopant diffusion providing a tapered core having a fluted cross section. However, providing uniform heating to the fibers to yield consistent diffusion with high yields and at reasonable costs has proven illusive.

Another method for approximating a flat-topped filter response in a bulk optic diffraction grating is taught by Martin, U.S. Pat. No. 6,084,695. Martin teaches a (de) multiplexer structure having a planar array of single channel fibers. A converging lens array is located in an input plane optically coupled to the single channel fibers with the single channel fibers placed at the focal point of the lenses. Martin teaches that the use of the converging lens array effectively broadens the filter function, improving the tolerance of the system to variations in the pass bands. The use of microlens array taught by Martin increases part count and therefore part costs and assembly complexity, and does not, by itself, adequately provide a flat-topped filter response.

Yet another way to provide a flat-topped filter response for a (de)multiplexer is taught by Lee, U.S. Pat. No. 5,999,290. Lee teaches the use of a 1 by 2 power splitter on an input waveguide and a 2 by 1 power splitter on an output waveguide to produce a flat-topped transmission band. Lee shows the power splitter used in conjunction with an arrayed waveguide (de)multiplexer. Power splitters are known to introduce undesirable losses in the system.

Amersfoort, U.S. Pat. No. 5,629,992, discloses the use of a multimode interference filter coupled to the end of a multi-channel fiber or single channel fibers in a grating based demultiplexer, respectively: The multimode interference filter is sized to multiply a singly peaked profile to effectively present a flattened top profile to thereby reduce sensitivity to wavelength drift. Use of the MMI prevents the apparatus taught in Amersfoort from being usable as both a multiplexer and a demultiplexer.

The present invention is intended to provide a flat-topped filter response for (de)multiplexers while overcoming some of the problems discussed above.

SUMMARY OF THE INVENTION

One aspect of the present invention is an apparatus for use in optical communications systems to multiplex or demultiplex an optical signal comprising optical channel(s) of different wavelength(s). The apparatus includes a multiplex optical waveguide propagating a plurality of optical channels, with the multiplex optical waveguide having a receiving/transmitting end. The apparatus further includes a plurality of single channel optical waveguides, each propagating a single channel and each having a receiving/transmitting end. A diffraction grating is optically coupled between the multiplex optical waveguide and the single channel optical waveguides for diffracting an optical signal between the receiving/transmitting end of the multiplex optical waveguide and the receiving/transmitting ends of the single channel optical waveguides. The diffraction grating has at least two surfaces optically coupled to the waveguides, each having a plurality of grooves therein. Each of the surfaces is angularly displaced relative to one another a select amount such that a portion of the optical signal diffracted by each surface is offset in the direction of dispersion relative to the portions of the optical signal diffracted by the other surfaces to broaden the transmission band at the receiving/transmitting ends of the single channel and multiplex optical waveguides. The diffraction grating may be reflective and the surfaces of the diffraction grating may be planar and formed in a single substrate. Preferably the grating has first and second planar surfaces with the first and second planar surfaces intersecting along a line of intersection at an angle between the first and second planar surfaces about the line of intersection that is greater than 180 degrees. Preferably the grooves in each planar surface are parallel to each other and are parallel to the line of intersection. The grating may be an echelle grating having a groove spacing of between about 50 and 300 grooves per millimeter and a blaze angle of about 51–53 degrees. A structure may be operatively associated with the receiving/transmitting ends of the multiplex and single channel optical waveguides for radially expanding an effective size of the receiving/transmitting ends.

Another aspect of the present invention is a method for broadening the transmission band of a (de)multiplexer used in fiber optic communications systems. The (de)multiplexer has a multiplex optical waveguide for propagating a plurality of optical channels and a plurality of single channel optical waveguides each for propagating a single channel. Each of the wave-guides had a receiving/transmitting end having an effective optical signal receiving size. A diffraction grating having a plurality of grooves formed in the surface therein is optically coupled between the multiplex optical waveguide and the single channel optical waveguides for diffracting an optical signal between the receiving/transmitting ends of the multiplex and single channel optical waveguides. The method of broadening the transmission band includes dividing the diffraction grating into distinct surfaces and angularly displacing the surfaces relative to one another a select amount, such that a portion of the optical signal diffracted by each surface is offset in a direction of dispersion relative to portions of the optical signal diffracted by each other surface. The grooves of the grating may be parallel and the diffraction grating is preferably divided into distinct planar surfaces parallel to the plurality of grooves. The method may also include radially expanding the effective optical signal receiving size of the receiving/transmitting end of the optical waveguides.

Yet another aspect of the present invention is a diffraction grating for use in (de)multiplexing optical signals in an optical communications system. The diffraction grating comprises at least two planar surfaces, each having a plurality of parallel grooves formed therein, each of the planar surfaces being angularly displaced relative to one another. The planar surfaces may be formed in a single substrate. The diffraction may include first and second planar surfaces, with the first and second planar surfaces intersecting along a line of intersection parallel to the grooves with an angle between the first and second planar surfaces about the line of intersection being greater than 180 degrees. The diffraction grating may be an echelle grating having a groove spacing of between about 30 and 300 grooves per millimeter and the blaze angle of between about 51–53 degrees.

A (de)multiplexer made in accordance with the present invention provides a flat-topped filter response without requiring addition of optical elements to the (de)multiplexer that can increase the complexity of manufacturing and cost as well as degrade product efficiency. Moreover, because the grating in accordance with the present invention does not require alteration to blaze angles and line densities, the grating can be optimized for maximum efficiency, decreased dispersion and desired resolution and then adapted as disclosed to provide a flat-topped filter response. A structure for radially expanding the effective size of a waveguide receiving/transmitting end as disclosed herein in combination with the inventive grating can be adapted to provide the many advantages of the grating to (de)multiplexers using standard optical communication fibers. The grating for providing these advantages is both easy to manufacture and inexpensive.

DETAILED DESCRIPTION OF THE PREFERRED EMBODIMENT

Figure 1:
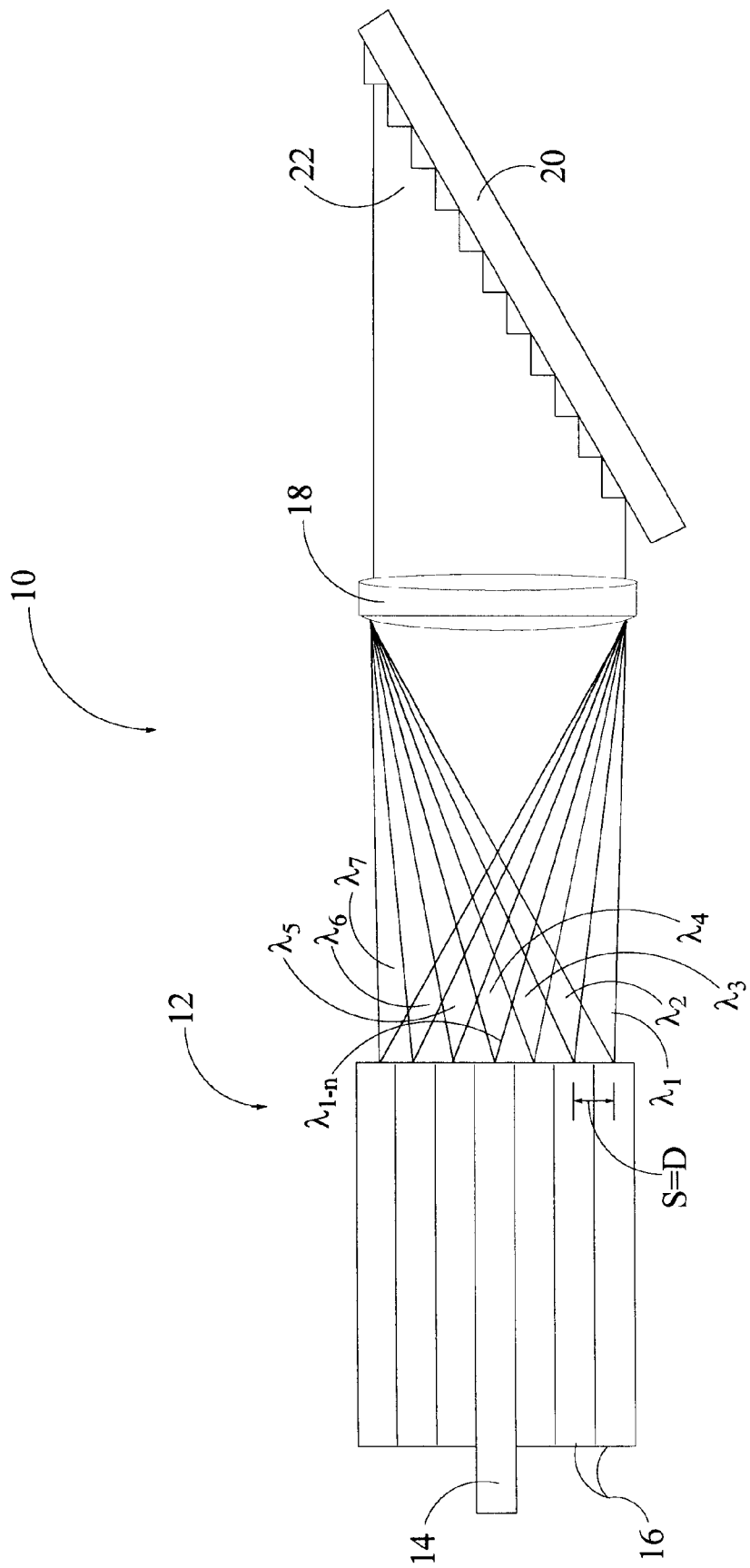
FIG. 1 is a schematic plan view of a multiplexer/demultiplexer using a bulk echelle grating in accordance with the present invention.

A multiplexer/demultiplexer for use in optical communication systems 10 is illustrated schematically in FIG. 1. It includes a pigtail harness 12 consisting of an input waveguide 14, a plurality of output waveguides 16 arranged in a linear array adjacent the input fiber, a collimating/focusing lens 18 and an echelle grating 20, each of which are optically coupled. In the present discussion the multiplexer/demultiplexer will be discussed in terms of a demultiplexer. The description applies equally to a multiplexer, only with the function of the input and output waveguides 14, 16 reversed. Also, for the sake of clarity, only seven output waveguides are illustrated (the center output waveguides underlies the input fiber in FIG. 1 as can be seen with respect to elements 142 and 148 of FIG. 14). Furthermore, the waveguides 14, 16 are preferably single mode optical fibers. As will be discussed in greater detail below, in the preferred embodiment, 90 or more output waveguides can be associated with a single input waveguide, depending upon the bandwidth channel, separation and a number of other factors.

As used herein, "optically coupled" or "optically communicates" means any connection, coupling, link or the like, by which optical signals carried by one optical element are imparted to the "coupled" or "communicating" element. Such "optically communicating" devices are not necessarily directly connected to one another, but may be separated by a space through which the optical signals traverse or by intermediate optical components or devices.

As illustrated in FIG. 1, the multiplexer/demultiplexer 10 is in "near littrow configuration," meaning that the incident beam $\lambda_{1-n}$ and the channels diffracted off the surface of the grating $\lambda_1, \lambda_2, \lambda_3, \lambda_4, \lambda_5, \lambda_6, \lambda_7$ are generally along the same optical axis (that is, they trace a very close path) and the lens both collimates the input beam $\lambda_{1-n}$ and focuses the diffracted channels $\lambda_1$–$\lambda_7$ to the output fibers 16.

The echelle grating 20, like other gratings such as echellette gratings, uses interference between light wavefronts reflected from various portions of its ruled surface or steps 22 to divide the incident beam consisting of a plurality of channels $\lambda_{1-n}$ having a select channel spacing within a select wavelength range $\lambda_{1-n}$ into separate channels of wavelength beams $\lambda_1$–$\lambda_7$ which are angularly dispersed by the grating into output waveguides some distance away. Referring to FIG. 1, the channel separation of the device (D), which is the product of the focal length of the focusing/collimating optic, the angular dispersion and the incremental channel spacing is equal to the distance S between the center of adjacent output waveguides. The echelle grating 20 is particularly suited to use in optical communication systems because of a unique combination of properties: 1) it provides clear channel separation notwithstanding channels being closely spaced (0.4 nm or less); 2) it provides large spatial separation of channels over relatively short distances; and 3) it is highly efficient in the range of optical communications wavelengths.

Figure 2:
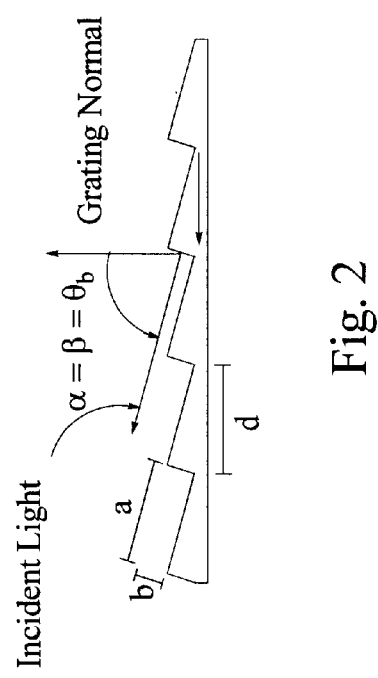
FIG. 2 is an enlarged cross-section of the echelle grating grooves illustrating relevant dimensions.

Referring to FIG. 2, for the purpose of this specification, echelle gratings are a special grating structure having groove density (1/d) of under 300 grooves/mm and a blaze angle $\theta_b$ of greater than 45° which typically operate at an order of diffraction greater than 1. In combination, these features enable a multiplexer/demultiplexer that efficiently separates closely spaced channels over a relatively small focal length (e.g., 5 inches) enabling a small form factor form factor (on the order of 10 inches in length or less).

Consideration of certain external and performance constraints point to the desirability of echelle gratings for DWDM. The external constraints include the following:

1) Minimize focal length, with a focal length of under 6 inches desired.
2) Center wavelength in near infrared, approximately at the center of the C-band, 1550 nm.
3) A minimal channel spacing (e.g., 0.4 nm or less).
4) Large free spectral range, 150 nm.
5) System f number in the range of 4–8.
6) Rugged, minimum cost system.

The performance constraints include:
1) Resolution greater than 20,000 (although resolution>15,000 will be suitable for some applications).
2) High dispersion.
3) Flat response across spectral range.
4) High efficiency or low loss, (>75%).
5) Minimize polarization dependent loss.

The external constraints of ruggedness size and cost minimization as well as performance constraints of ease of alignment and high efficiency dictate a littrow configuration, which simplifies the system optimization analysis.

FIG. 2 illustrates the echelle grating geometry and the variables set forth below.

$\theta_b$=blaze angle
$\alpha$=incident angle
$\beta$=diffracted angle
In littrow, $\theta_b=\alpha\cong\beta$
b=step (reflective surface) size
d=1/groove density
a=riser size Examination of a number of constraining factors discussed above illustrate the utility of echelle gratings for DWDM.

1. Constraining Factors: f number (f) in range of 4–8 and resolution ("R")>20,000.
   Result: For a grating in littrow configuration, $$R > 2\left(\frac{W}{\lambda}\right),$$

where
W is the illuminated width of the grating. Thus, or
W≈(20,000/2)(1550 nm) or
W≈1.55 cm
W×f=
fl (focal length), or
fl≈1.55 cm×8≈124

2. Constraining Factors: Fl>124 mm and channel separation at at least 80 $\mu$.
   Result: For an echelle grating in littrow, dispersion $$\left(\frac{d\theta_b}{d\lambda}\right) = \frac{m}{b} \cdot fl,$$

where m=order of diffraction. Thus, assuming channel separation to be at least 80$\mu$, $\Delta\lambda$=4×10$^{-4}\mu$ and fl=1.2×10$^4\mu$, m>1.5b.

3. Constraining Factors: FSR (free spectral range)>150
   Result:

$$FSR = \frac{\lambda}{m},$$

which implies $$m = \frac{1550}{150},$$

or m≦10.

4. Constraining Factors: Wish to provide a flat response over the bandwidth.
   Result: The diffraction envelope must have a broad enough maximum so that loss is minimized at the extremes of the wavelength range. This dictates b<8.5$\mu$. An order over 7 spreads the light too much across the diffraction peak, resulting in unacceptably low efficiency. Thus: b<8.5$\mu$ and m≦7.

5. Constraining Factors: High efficiency (>85°)
   Result: Efficiency is a function of step size. A step size must be selected providing a channel width capturing 90% of the signal at a select order.
   b>3$\mu$ yields suitable efficiency.

6. Constraining Factors: Limitations on m from 4. and 2. above.
   Result: 1.5<m<7.

7. Constraining Factors: For an echelle grating in littrow mode:

$$a = \frac{m\lambda}{2}.$$

Result:
   a=3.88$\mu$ at m=5
   4.65$\mu$ at m=6
   5.43$\mu$ at m=7

Figure 3:
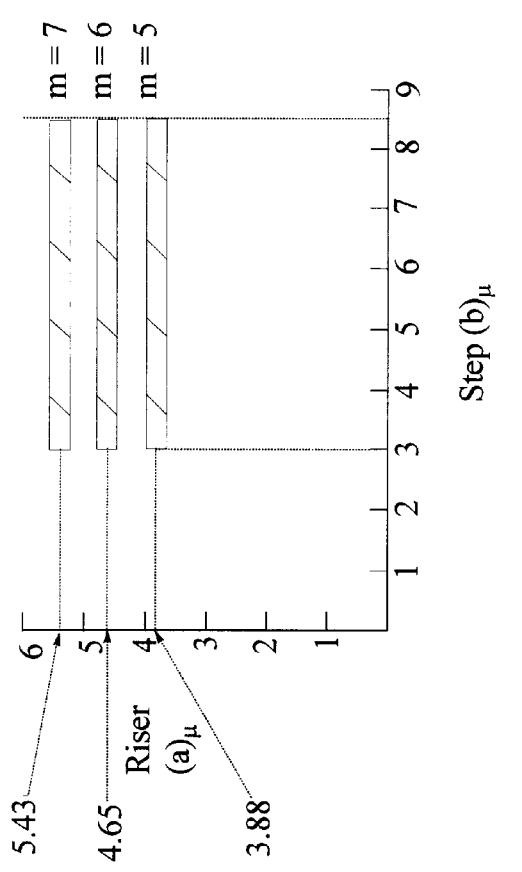
FIG. 3 is a graphical representation of possible step widths and riser heights at different orders which may yield a working echelle grating.

FIG. 3 illustrates that these constraints and results provide a range of values for a and b at a given range of suitable orders (m). Simulations aimed at maximizing efficiency and minimizing polarization dependent loss optimize around blaze angles and groove frequencies that fall in the range of echelle gratings, i.e., 45<$\theta_b$<78° and d<300 grooves/nm. Furthermore, limitations on manufacturing further dictate that only echelle gratings can provide the necessary results within the external and performance constraints.

In designing a functioning multiplexer/demultiplexer, a number of design parameters were selected that were dictated by many of the external and performance constraints set forth above. An exemplary configuration is illustrated schematically in FIG. 4, with like elements having the same reference number as FIG. 1. The dictating constraints and their effect on the exemplary bulk echelle grating DWDM are as follows:

1. Channel Characteristics

Currently optical communications utilize what is know as the "C" band of near infrared wavelengths, a wavelength band ranging from 1528–1565 nanometers (nm). This provides a bandwidth or free spectral range of 37 nm available for channel separation. Known prior art multiplexer/demultiplexers require a channel spacing of 0.8 nm or even 1.6 nm, resulting in a possibility of only between 48 and 24 channels. Because echelle gratings provide markedly superior channel dispersion, a much smaller channel spacing of 0.4 nm was chosen, resulting in a possibility of 93 channels over the C band. As the tuning range of semiconductor lasers increases and optical communications expand beyond the "C" band to include the "L" band (1566–1610 nm) and the "S" band (≈1490–1527 nm), a total bandwidth of about 120 nm or more is foreseeable, creating a possibility of the multiplexer/demultiplexer accommodating 300 channels or more per input fiber.

Current optical communications operate primarily at a channel frequency of 2.5 GHz, known as OC48. At OC48 the channel width $\lambda_{48}$=0.02 nm. Optical communications are currently beginning to adopt a frequency of 10 GHz, know as OC192. At OC192 the channel width $\lambda_{192}$=0.08 nm.

2. Fiber Dimensions

Figure 4:
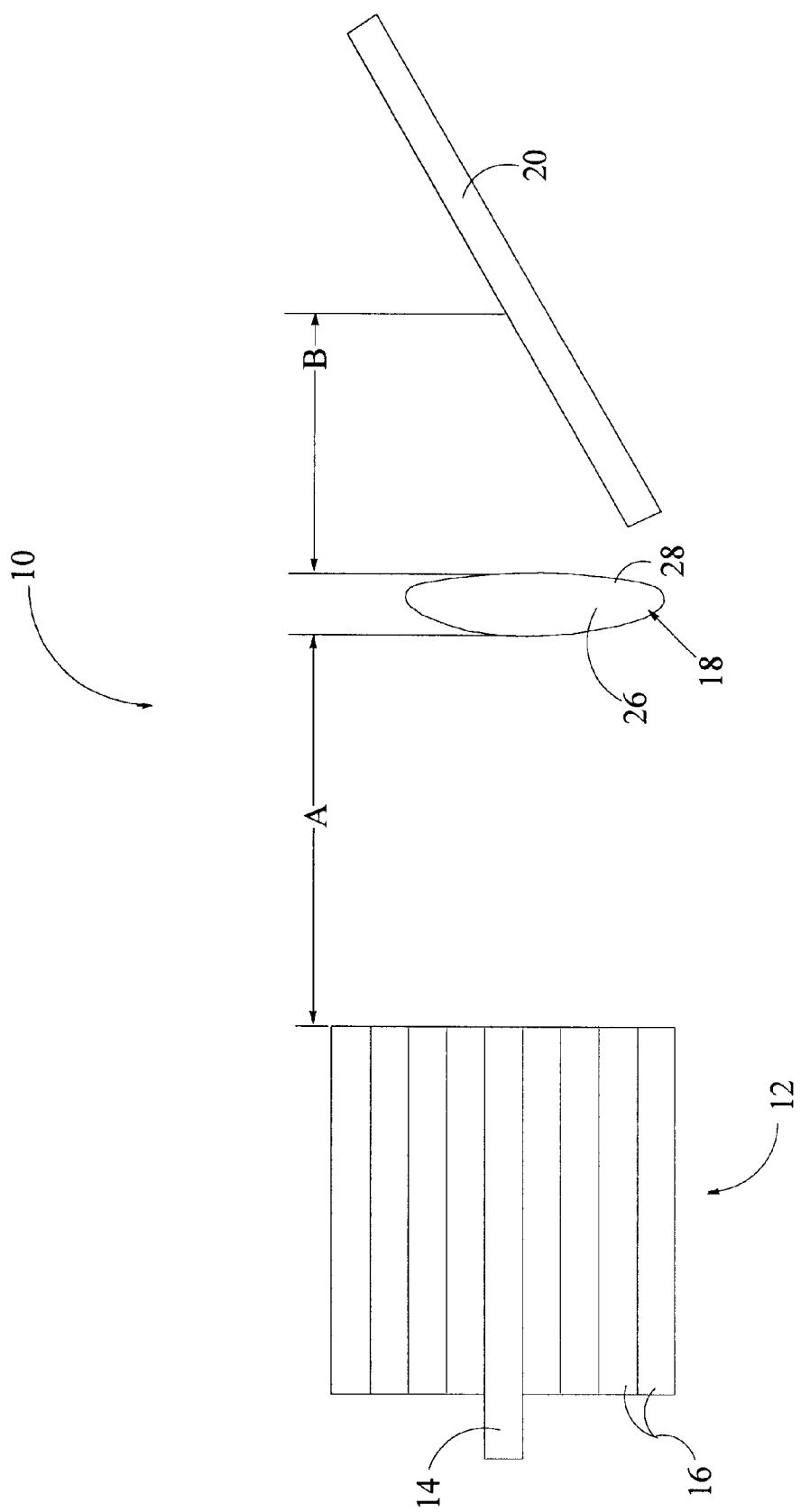
FIG. 4 is a schematic representation of an example of a multiplexer/demultiplexer with a bulk echelle grating in accordance with the present invention.

Standard single mode optical fiber used in optical communications typically have an outer diameter of 125 microns ($\mu$) and a core diameter of 10$\mu$. Optical fibers having an outer diameter of 80$\mu$ and core diameter of 8.3$\mu$ are available, model SM-1250 manufactured by Fibercore. In this example, both the input fiber 14 and the output fiber 16 are single mode and share the 80$\mu$ outer diameter. Assuming the output fibers 16 are abutted in parallel as illustrated in FIG. 4, this results in the core centers being spaced 80$\mu$, or a required channel separation D of 80$\mu$ at the select focal length. Because fibers of different outer diameter are available and fibers claddings can be etched away, it is possible that the 80$\mu$ spacing can be reduced, with core spacing of 40$\mu$ or less being foreseeable, which could enable shorter focal lengths or different echelle grating designs having lesser angular dispersion. The spread of the beam emitted from the fiber was 10° at the e-folding distance, although it was later found to be 14° at the 1% point.

3. Form Factor

The design was intended to provide a high channel density in a form factor consistent with or smaller than used in current multiplexer/demultiplexer devices. A total length of between 10–12 inches was the design target. To accommodate all the optics and harnesses, a maximum focal length of 5 inches (127 mm) was chosen. As discussed above, in light of the constraining factors of the f number between 4–8 and a resolution (R)>20,000, a focal length of 124 was ultimately dictated.

4. Dispersion Limitations

In order to prevent the loss of data, it was necessary that the dispersion of the echelle grating be constrained. The initial 0.4 nm channel spacing at the echelle gating was required to be about 80$\mu$ of separation at the output fibers (corresponding to the core spacing). On the other hand, the 0.08 nm channel width of OC192 frequencies could not disperse to much greater than the fiber core aperture over the focal length. Thus:

$$I = I_o \left(\frac{\sin\beta}{\beta}\right)^2 \left(\frac{\sin N\alpha}{\alpha}\right)^2$$

5. Grating Design

The variables affecting grating design are:
1) wavelength range
2) efficiency
3) dispersion (D)
4) desired resolution $$\left(\frac{\lambda}{\Delta\lambda}\right)$$

FIG. 3 is a cross-section showing the principle echelle grating dimensions including: blaze angle ($\theta_b$), wavelength range and groove density (d).

For design of the grating, 150 channels centered on 1550 nm was chosen. This results in a physical size of the spectral image of (number of channels)×(maximum separation, or 150×80$\mu$=12,000$\mu$. This desire to have 90% of the intensity contained in 12,000$\mu$ constrains the size of b. The far field pattern of the diffraction grating is $$I = I_o \left(\frac{\sin\beta}{\beta}\right)^2 \left(\frac{\sin N\alpha}{\alpha}\right)^2$$

N=number of lines illuminated, $$\beta = \frac{\pi b}{\lambda} \sin\theta_b \text{ and } \alpha = \frac{\pi d}{\lambda} \sin\theta_b.$$

Spread sheet calculations show that $b \leq 5.5\lambda$ (or $b \leq 8.5\mu$), is necessary to make the spectral image>12,000$\mu$ at its 90% intensity point.

To minimize loss, i.e., maintain adequate efficiency, $b > 2\lambda$. Thus $2\lambda < b < 5.5\lambda$. (Condition A).

In littrow mode, the angular dispersion is:

$$\left(\frac{d\theta}{d\lambda}\right) = \frac{m}{d \cos\theta_b} \text{ or } \frac{d\theta}{d\lambda} = \frac{m}{b}$$

$$\Delta \times (\text{linear separation}) = (\Delta\theta)(fl)(\Delta\lambda) = \left(\frac{m}{b}\right)(\Delta\lambda) \cdot (fl)$$

$$80\mu < \frac{m}{b}(4 \times 10^{-4}\mu)(1.2 \times 10^5 \mu)$$

$$m > \frac{1.6 b_\mu}{.6\mu} > 1.6 b_\mu$$

However, for OC192, dispersion must be constrained to contain the 0.08 nm channel width in a 10$\mu$ core, so that $m < 3.34 b_\mu$.

Thus, $1.67b < m < 3.34b$ (Condition B).

The desired resolution $(R) = \lambda/\Delta\lambda = N \cdot m$.

Here, $\lambda = 1550$ nm and $\Delta\lambda = 0.08$ nm, yielding a required resolution R=19,375 or approximately 20,000. Assuming a beam size at the grating of 2.1 cm (based upon a fl=124 cm and 10° divergence):

$$N = \frac{p(2.1)}{\cos\theta_b}, p = \text{lines/cm} = \frac{1}{d} \text{ Thus,}$$

$$20,000 < \frac{2.1 \times 10^{-2} \text{cm}}{d \cos\theta} \cdot m = \frac{2.1^{-2} \text{cm}}{b} m \text{ or}$$

$b < 1.05 m$ (Condition C).

To align the order m with the diffraction peak in littrow mode, we know $$a = \frac{m\lambda}{2},$$

or a must have the values:

$$\left.\begin{array}{l} a = 3.88\mu \text{ at } m = 5 \\ 4.65\mu \text{ at } m = 6 \\ 5.43\mu \text{ at } m = 7 \end{array}\right\} \text{ (Condition D)}$$

Only as $\theta_b$ increases to greater than 45° is it possible for conditions A and D to be satisfied. Assuming $\theta_b = 60°$, and m=5, a=3.38$\mu$ b=2.24$\mu$ d=4.48$\mu$.

All of conditions A–D are satisfied.

Selection of the precise groove density and blaze angle are also affected by the polarization dependent loss and manufacturing constraints. For the embodiment illustrated in FIG. 4 use of an interferometrically controlled ruling engine to machine the line grating drove the selection of a line density evenly divisible by 3600. Considering these various factors led to selection of groove density d=171.4 grooves/mm and m=5. This leads to a=3.88$\mu$, b=3.55$\mu$, and a corresponding blaze angle of 52.6° for this example. However, this methodology shows that for a focal length between 30–125 mm and an order of 5–7, potential blaze angles range between 51° and 53° and the groove density carries between 50 and 300 grooves/mm to provide linear channel separation of between 40–125 microns and an angular dispersion of the echelle of between 0.091 and 0.11 degrees/nm.

In the example of FIG. 4, the echelle grating has a groove density of 171.4 grooves/mm and a blaze angle of 52.6°. The echelle may be formed from one of several known methods. For example, it may be formed from an epoxy layer deposited on a glass substrate into which a master die defining the steps is pressed. The steps are then coated with a highly reflective material such as gold. The steps may also be precision machined directly into a glass or silicon substance and then coated with a reflective material. A further option is the use of photolithographic techniques described in McMahon, U.S. Pat. No. 4,736,360, the contents of which are hereby expressly incorporated by reference in its entirety.

The lens 18 could be a graded index (GRIN) optic with spherical surfaces or a compound lens with one or more surfaces that might not be spherical (aspheric). The use of lenses or a single lens to collimate the beam and focus the dispersed light limits spherical aberrations or coma resulting from the use of front surface reflectors that require the optical rays to traverse the system in a off-axis geometry. A first type of potential lens uses a radially graded refractive index to achieve near-diffraction limited imaging of off-axis rays. A second type of lens actually consists of at least two individual pieces cemented together (doublet). Another option uses three individual lens pieces (triplet). These pieces may individually have spherical surfaces, or if required for correction of certain types of aberration, aspheric surfaces can be utilized. In this case, the lens would be referred to as an aspheric doublet or triplet.

In the example illustrated in FIG. 4, the lens is an aspheric singlet of a 25.4 mm diameter having a spherical surface 26 with a radius of curvature of 373.94 mm and an aspheric surface 28 with a radius of curvature of 75 mm and a conic constant of ~0.875. The average focal length in the 1520–1580 nm wavelength range is 125.01 nm. Thus, the distance A from the center of the spheric surface to the emitting end of the input and output fibers 14, 16 is about 125 mm. The average distance between the aspheric surface 28 and the center of the surface of the grating 20 is about 43.2 mm.

Figure 5:
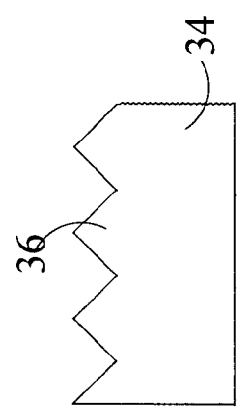
FIG. 5 is a partial cross-sectional view of a pigtail template.

In the pigtail 12 of FIG. 1, the input and output fibers terminate in the same plane. This is also the case with the example illustrated in FIG. 4. In some configurations, however, the inlet 14 and outlet fibers 16 are on slightly different axes and do not terminate in the same plane. The fibers 14, 16 of the pigtail are precisely located by being fit into a template 34 illustrated schematically in FIG. 5. The template 34 has a plurality of parallel v-shaped grooves 36. The template and v-shaped grooves are preferably formed by etching the grooves 36 into a silicon substrate. In the example in FIG. 4, the grooves of the template are spaced 80$\mu$.

Figure 6:
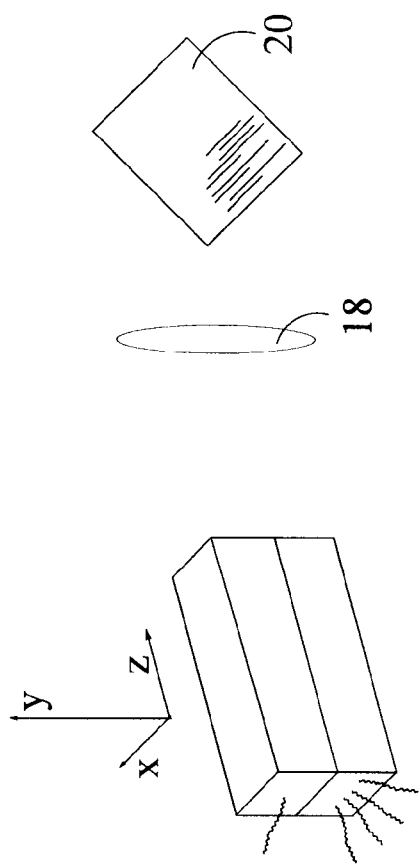
FIG. 6 is a perspective view of the multiplexer/demultiplexer with bulk echelle grating of FIG. 1 illustrating the potential adjustment of the components.

The example configuration of FIG. 4 is shown in perspective view in FIG. 6. To facilitate alignment, the pigtail 12, the lens and the grating 20 have limited freedom of movement in multiple directions. Once they are moved into position, they are secured in place by clamps or a suitable bonding agent. The lens is held stationary. The pigtail 12 is movable by translation along the x, y and z axes. The input and output fibers can be moved independently along the x axis. The echelle grating 20 is fixed against translational movement except along the z axis. It can be rotated about each of the x, y and z axes. Other possible combinations of element movement may also yield suitable alignment.

The dimensions and performance criterion of the DWDM device 10 of FIG. 4 are summarized as follows:

Fibers: SM-1250 (Fibercore)
Outer diameter 80$\mu$
Core diameter 8.3$\mu$
f Number 4–8
Lens: Aspheric singlet
Average focal length (fl)=125
Optical Signal:
$\lambda$=1528–1565 nm
channel spacing=0.4 nm
Grating:
d=5.83$\mu$
$\theta_b$=52.6°
order=6
System Performance:
D (linear separation)=80$\mu$
Resolution (R)=20,000
Efficiency=75%

Figure 16:
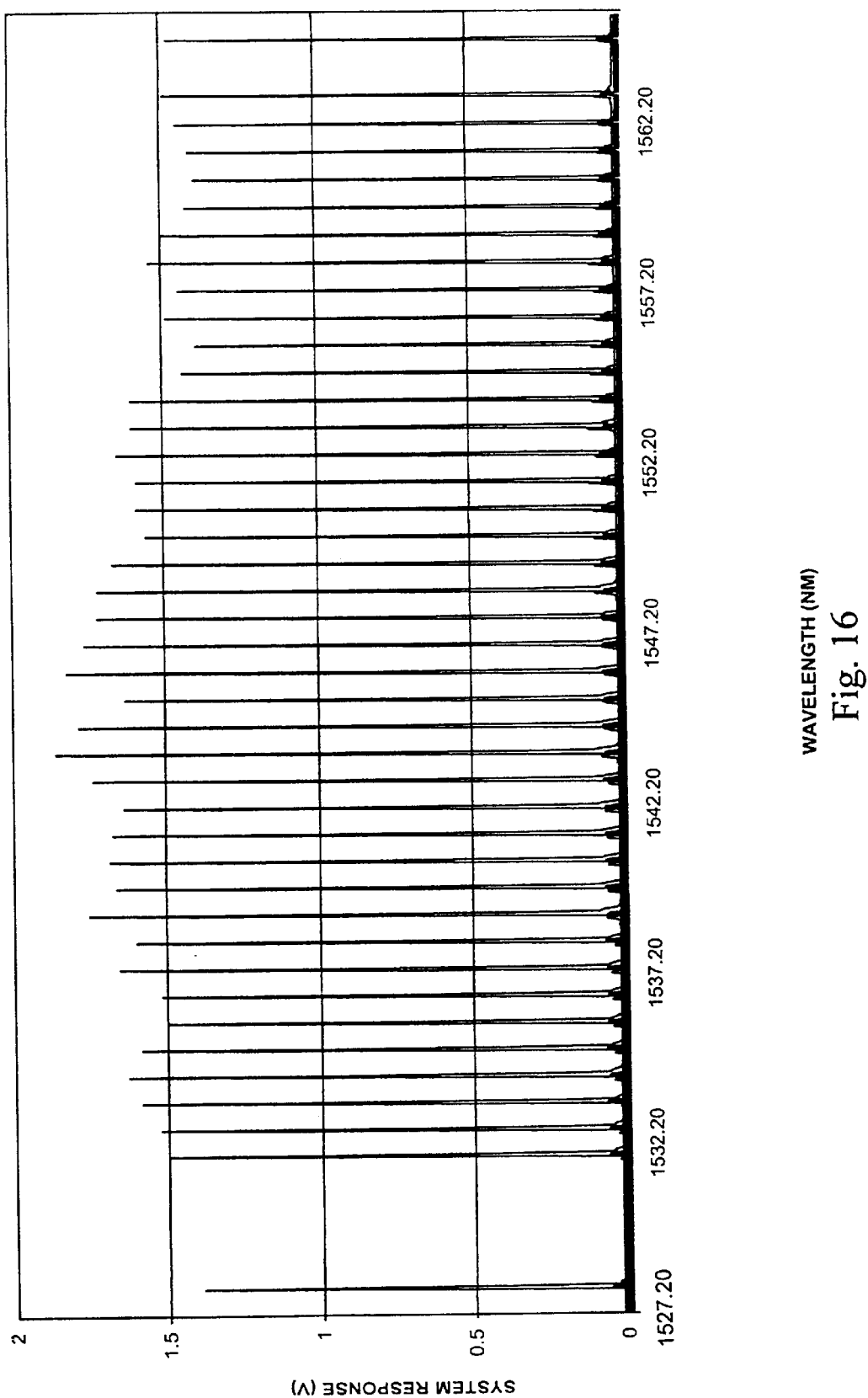
FIG. 16 is a plot of the system response versus wavelength for the multiplexer/ demultiplexer of FIG. 4.

FIG. 16 is a plot of the system response (y-axis) versus wavelength (x-axis) for the grating described above at a 100 GHz (0.8 nm) channel spacing over the 1528–1565 nm bandwidth at an average insertion loss of 7.5 db. This plot illustrates the flat insertion loss across the bandwidth.

Figure 7:
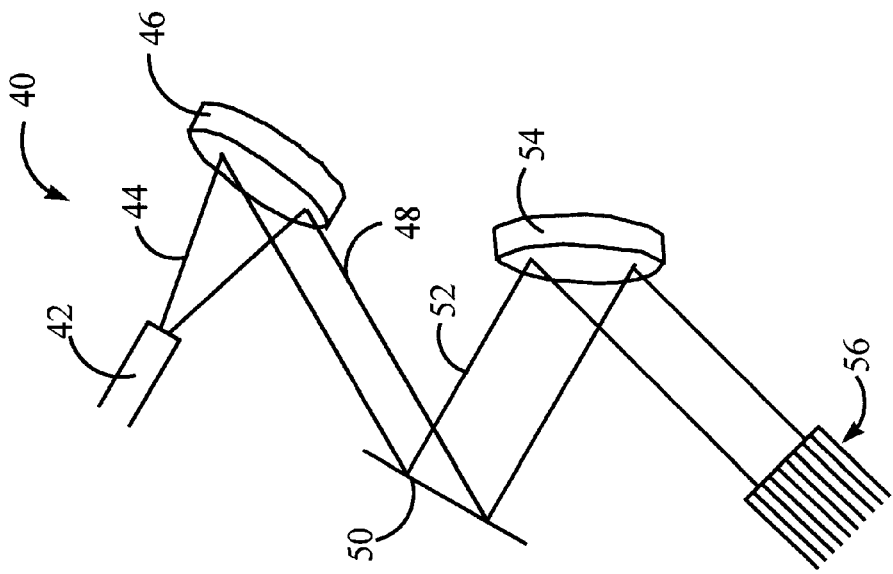
FIG. 7 is a schematic view of a first alternate embodiment of the multiplexer/ demultiplexer using a bulk echelle grating including a pair of collimating/focusing concave mirrors.

As an alternative to the use of a littrow configuration as well as the use of collimating lenses, concave mirrors may be used for collimating and focusing the incident beam. A first alternate embodiment of a concave mirror dense wavelength multiplexer/demultiplexer 40 is shown schematically in FIG. 7. Single mode input fiber 42 emits a divergent incident beam 44 consisting of multiplexed channels onto the surface of a collimating/focusing concave mirror 46. The collimated beam 48 is then directed in an off-axis manner to the surface of an echelle grating 50. The echelle grating disperses the channels according to their wavelength in the manner discussed above with respect to FIGS. 1 and 4 and the dispersed channels 52 are reflected off axis off the front surface of the concave collimating/focusing mirror 54. The collimating/focusing mirror 54 then focuses and reflects the various channels to a corresponding fiber of an output fiber array 56. As alluded to above with respect to the discussion of the embodiments of FIGS. 1 and 4, use of surface reflecting optics such as the collimating mirror 46 and the concave focusing mirror 54 requires that the optical beams traverse the system in an off-axis geometry which creates significant aberrations (spherical aberrations and coma) that significantly limit the performance of the system. However, the use of the front surface reflecting optics has the potential of facilitating a more compact form factor than is possible with littrow configurations using a single optical lens. As should be readily apparent, combinations of front surface reflecting optics and lenses can be used in non-littrow configurations where necessary to balance form factor minimization requirements and optical aberrations.

Figure 8:
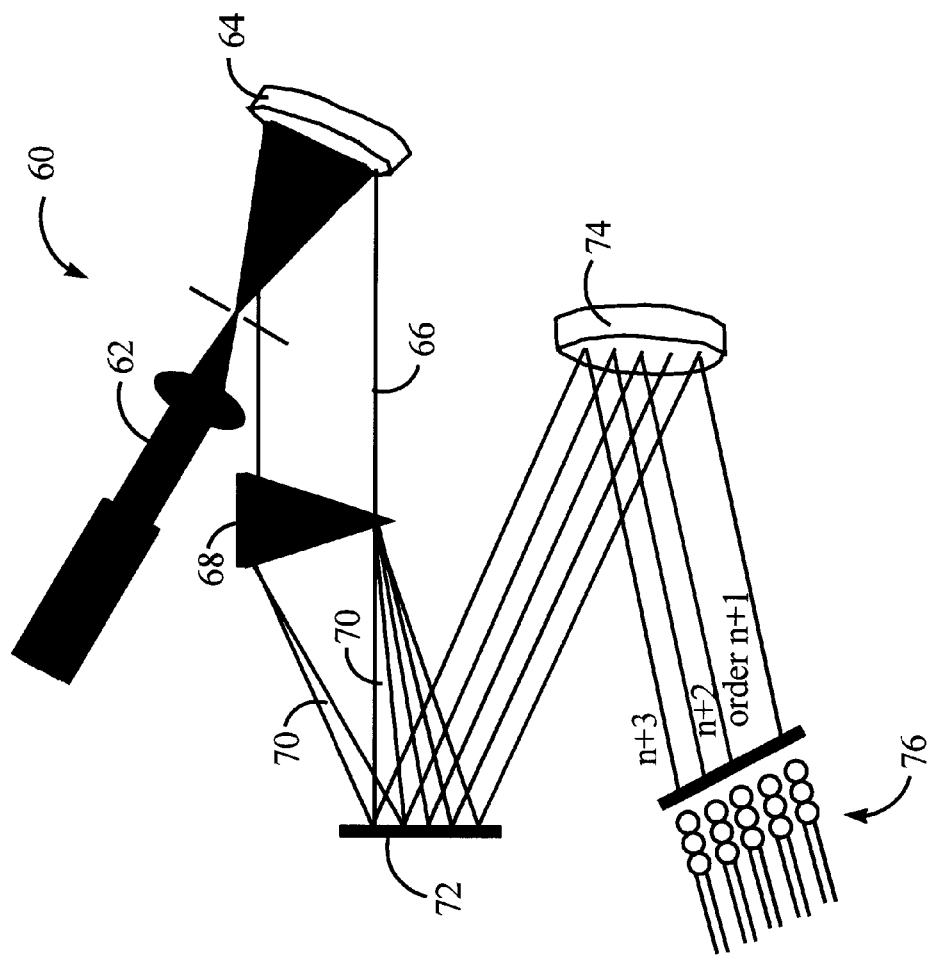
FIG. 8 is a second alternate embodiment of the multiplexer/demultiplexer of FIG. 7 further including a prism providing for wavelength dispersion in a horizontal direction.

A second alternate embodiment 60 is illustrated in FIG. 8 which is a schematic representation of an echelle grating multiplexer/demultiplexer using a prism in combination with front surface optical mirrors. In this embodiment, light from a single mode input fiber 62 is directed off a collimating/focusing mirror 64 and the collimated beam 66 is directed through prism 68. The prism 68 provides for wavelength dispersion in a horizontal direction as indicated by the beams 70. These horizontally dispersed beams 70 are directed off the echelle grating 72 which in turn diffracts the beams 70 in an orthogonal dimension and directs these diffracted beams off the front surface of the concave collimating/focusing mirror 74. A two dimensional output fiber array 76 receives the focused beams from the collimating/focusing mirror 74. The use of the prism 68 in combination with the echelle grating 72 provides a two dimensional array of wavelength dispersion and may therefore facilitate detector arrays of shorter length as may be desirable in certain applications.

Figure 9:
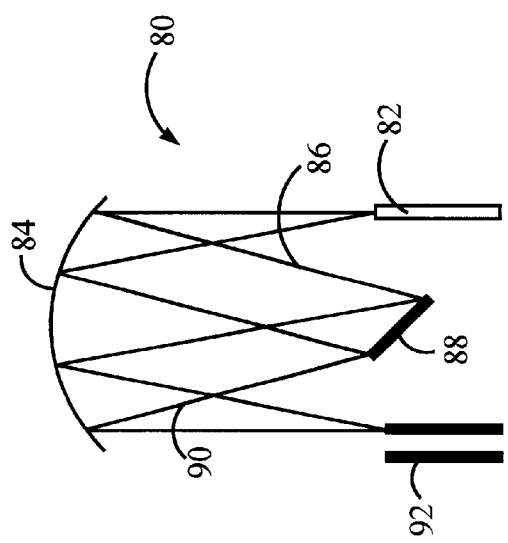
FIG. 9 is a third alternate embodiment of the multiplexer/demultiplexer using a single collimating/focusing mirror.

FIG. 9 is a schematic representation of a third alternate embodiment 80 using a single concave mirror as both a collimating and focusing optic along the optical axis. In this embodiment, input fiber 82 directs a beam consisting of multiplexed channels to the surface of the concave mirror 84. A collimated beam 86 is reflected off the echelle grating 88 which diffracts the multiplexed signal in the manner discussed above. The demultiplexed channels are then reflected off the surface of the concave mirror 84 and directed into the array of output fibers 92. While the embodiment 80 contemplates the mirror 84 being spherical and therefore having a constant diameter of, for example 25 cm, a slightly parabolic or aspheric mirror may be used to improve image quality, if necessary.

Figure 10:
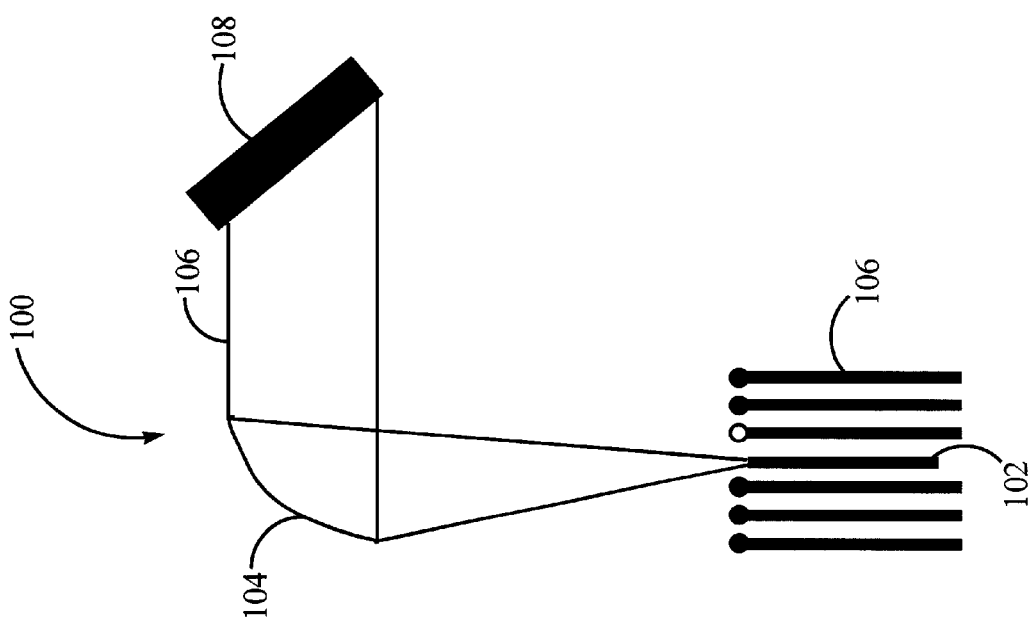
FIG. 10 is a fourth alternate embodiment of the multiplexer/demultiplexer in accordance with the present invention using an off-axis parabolic mirror as the collimating/focusing optic with the device arranged in a near-littrow configuration.

FIG. 10 is a fourth alternate embodiment 100 using an off-axis parabolic mirror as the collimating/focusing optic. In this embodiment, multiplexed light from the input fiber 102 is directed off the front surface of an off-axis parabolic mirror 104 which in turn directs a collimated beam of light 106 off the surface of an echelle grating 108. The multiplexed light is reflected off the surface of the echelle grating 108 back to the surface of the off-axis parabolic mirror 104 and dispersed to respective output fibers 106. In this embodiment, the echelle grating is in near-littrow configuration, thereby directing light back to the output fibers 106.

Figure 11:
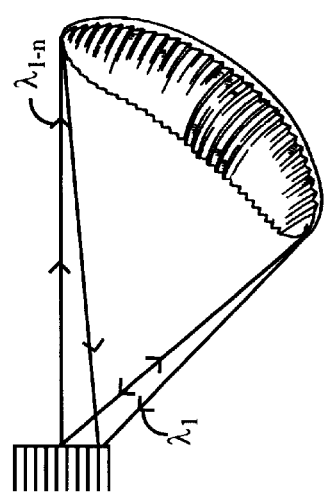
FIG. 11 is a fifth alternate embodiment of the multiplexer/demultiplexer of the present invention using a concave echelle grating.

A fifth alternate embodiment illustrated in FIG. 11 uses a concave echelle grating 107 configured to be the optic which collimates and focuses the incoming beam. This embodiment eliminates the need for the collimating/focusing lenses or concave mirrors of alternate embodiments one–four.

Various modifications can be provided to the basic echelle grating demultiplexer structures illustrated schematically in FIGS. 1–11 to further increase the channel carrying capacity of single mode optical fibers. As alluded to above, it is foreseeable in the future that advancements in optical amplifier technology will enable bandwidth in excess of the current 60–80 nm bandwidth used in optical communication. Such broad bandwidths tax the ability of an echelle grating DWDM to effectively multiplex and demultiplex the entire bandwidth, particularly in the frequencies at the edge of this broad band. Accordingly, it would be useful and desirable to use a network of echelle grating DWDM devices with each device optimized to multiplex/demultiplex light in a portion of the broad spectral range. For example, assuming future amplifier technologies enable bandwidths on the order of 120–180 nm, each echelle grating DWDM could be optimized to function with a portion, for example ½, of the bandwidth, 60–90 nm.

Figure 12:
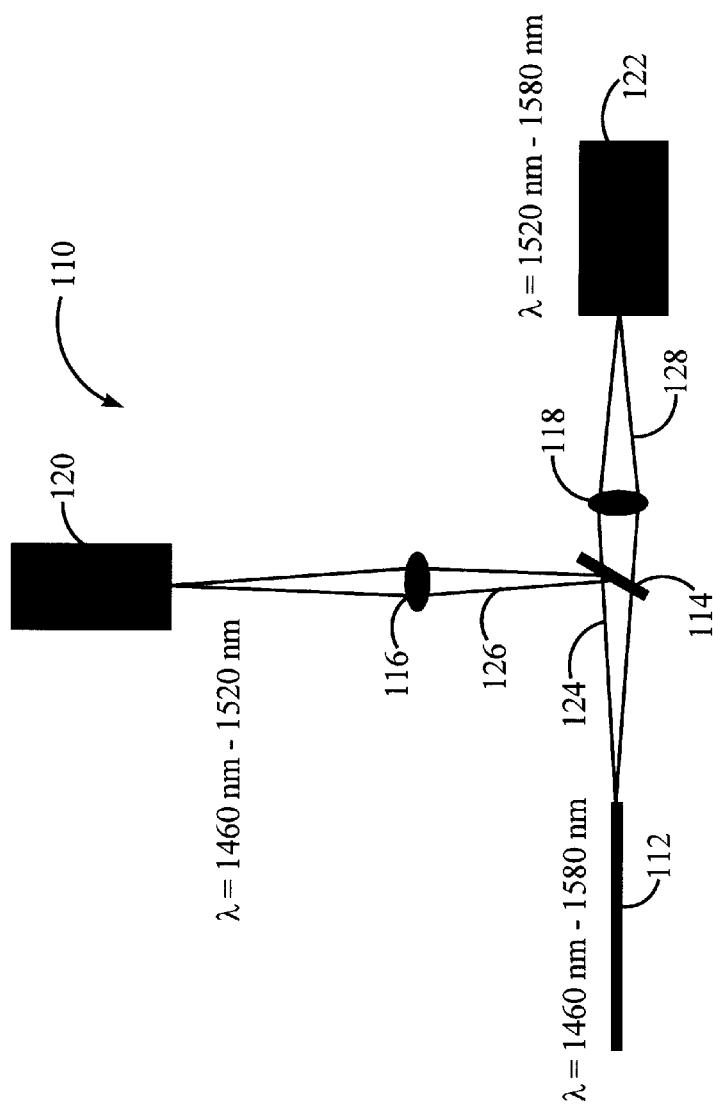
FIG. 12 is a schematic representation of an apparatus for dividing a broad bandwidth into bandwidth segments for multiplexing/demultiplexing.

FIG. 12 illustrates schematically an apparatus 110 for dividing a broad bandwidth for multiplexing/demultiplexing. The apparatus 110 consists of an input fiber 112, a high pass thin film filter 114, a first focusing lens 116, a second focusing lens 118, a first echelle grating DWDM device 120 and a second echelle DWDM device 122.

By way of example, the operation of the apparatus for dividing broad band signals 110 will be discussed in terms of a demultiplexer. As with other embodiments of this invention, the apparatus may likewise function as a multiplexer simply by reversing the direction of light propagation. A multiplexed beam 124 emitted from the input fiber 112 is directed onto the high pass thin film filter 114. The high pass thin film filter has a design cut off wavelength that reflects the lower half of the wavelength range toward the first echelle grating DWDM 120. The upper half of the wavelength range passes through the filter 114 to the second echelle DWDM device 122. In this example, the input wavelength is in the range of 1460–1580 nm. The high pass thin film filter is designed to cut the band at 1520 nm. Thus, a wavelength range of 1460–1520 nm is directed toward the first echelle grating DWDM and a wavelength band of 1520–1580 nm is directed toward a second echelle grating DWDM device. The signal directed toward the first echelle grating DWDM is optically coupled to the first focusing lens 116 which directs the lower wavelength beam as an input to the first echelle grating DWDM. In a like manner, the upper wavelength beam 128 is optically coupled to the second focusing lens 118 which focuses the upper wavelength beam 128 as an input beam to the second echelle DWDM device 122.

The present example contemplates the use of a high pass thin film filter 114. However, other waveband dividing elements could be used instead, including devices using fiber Bragg gratings.

Figure 13:
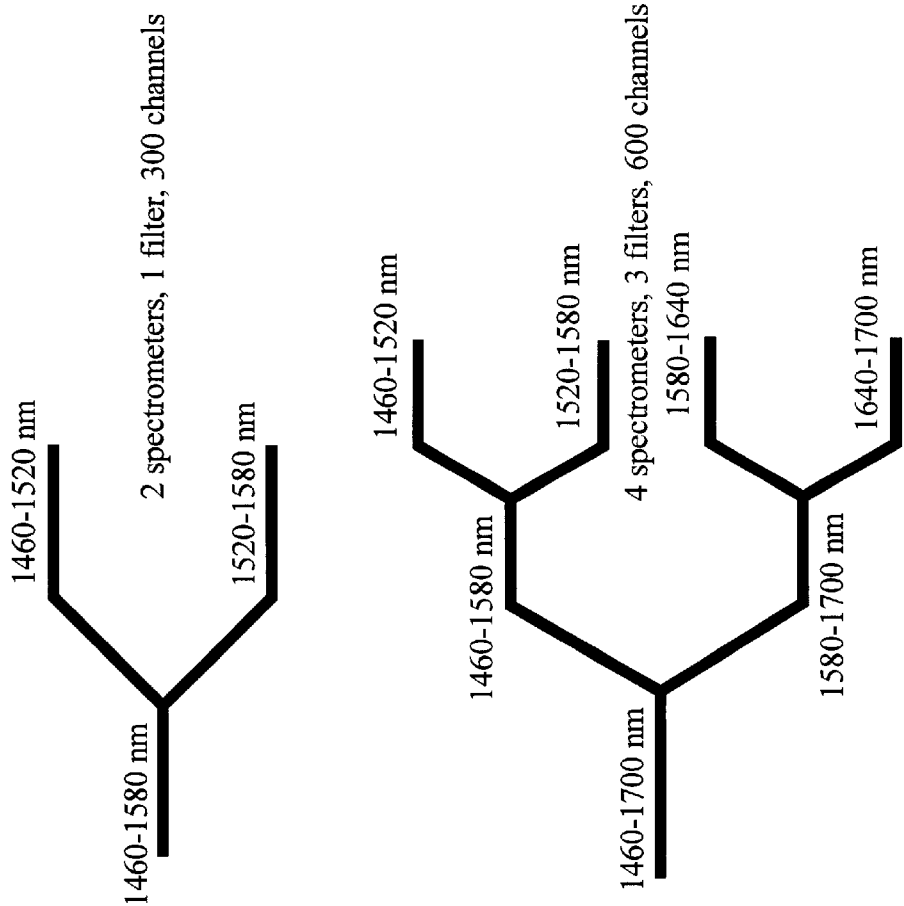
FIG. 13 is a schematic representation of the embodiment of FIG. 12 using three waveband dividing elements.

The first and second echelle grating DWDM devices 120, 122 of the present invention could have any of the configurations discussed above with regard to FIGS. 1–11. The use of the echelle DWDM devices for demultiplexing the split wavelength bands provide the many advantages discussed above with regard to the embodiments illustrated in FIGS. 1–11. However, the present invention could be practiced with other DWDM devices such as fiber Bragg grating devices, integrated waveguide arrays or the like. With an echelle spectrograph permitting wavelength spacing of 0.4 nm, a device for providing a total wavelength range of 120 nm will allow up to 300 channels to be demultiplexed from a single fiber. Furthermore, this system is scalable. FIG. 13 illustrates schematically how an input bandwidth of 1460–1700 nm can be divided using three waveband dividing elements to four 60 nm bandwidth beams each of which can be input into an optimized echelle grating DWDM device. Such a device is capable of accommodating a total waveband of 240 nm and assuming a wavelength spacing of 0.4 nm, a total channel count of 600.

Figure 14:
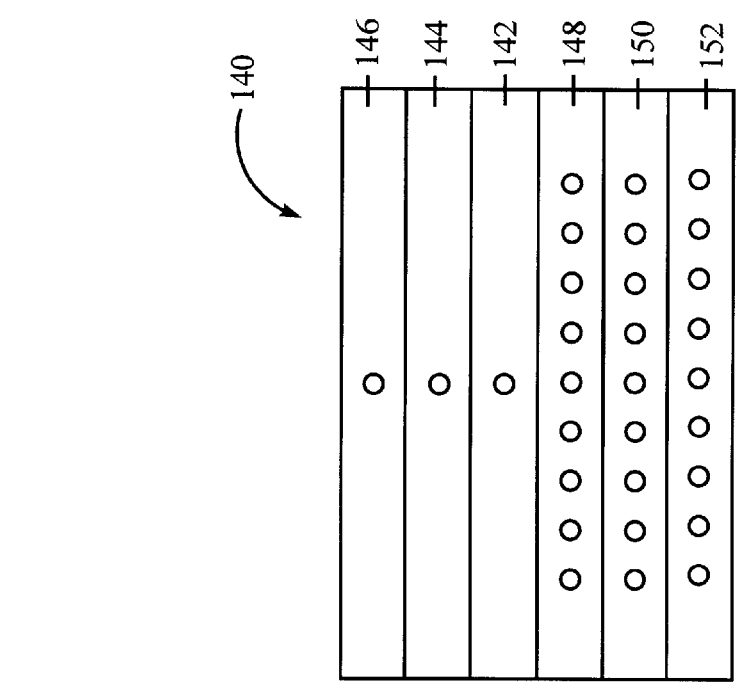
FIG. 14 is a schematic elevation of a pigtail harness having a one-dimensional input array of fibers and a two dimensional output array of fibers.

The bulk optic echelle DWDM of the present invention is able to simultaneously demultiplex signals from a number of input fibers. In each of the echelle grating DWDM devices illustrated in FIGS. 1–7 and 9–11 above, light is spacially resolved in only one dimension, vertically in a direction transverse the dispersion direction. As a result, input fibers can be vertically stacked in a linear array and a corresponding two dimensional array of output fibers can be provided for receiving demultiplexed signals from the various input fibers. This concept is illustrated schematically in FIG. 14. FIG. 14 is an elevation view of a pigtail harness 140 from the direction of the collimating/focusing optic. First, second and third input fibers 142, 144, 146 lying in a vertical linear array are optically coupled to first, second and third horizontal output rows 148, 150, 152, respectively. Thus, a one dimensional input array produces a two-dimensional output array. While the present example is limited to three input fibers 142, 144, 146 and only nine output fibers in the output first, second and third output rows 148, 150, 152, the actual number of output fibers will correspond to the number of input channels and will be a function of the channel separation and input bandwidth, and may easily exceed 90 output fibers per output fiber row. Each output fiber has a core center, and the output fiber core centers are spaced a distance equal to the linear separation of the grating at the device focal length. Further, the number of corresponding input and output arrays may be greater than three and is largely a function of external factors such as the space available for the pigtail harness 140. As should be appreciated, this configuration allows a single demultiplexer to demultiplex channels from a number of input fibers, thereby minimizing the number of echelle grating DWDM devices required for a multiple input fiber optical system. This further illustrates the flexibility and scalability of the echelle grating DWDM devices in accordance with the invention.

Figure 15:
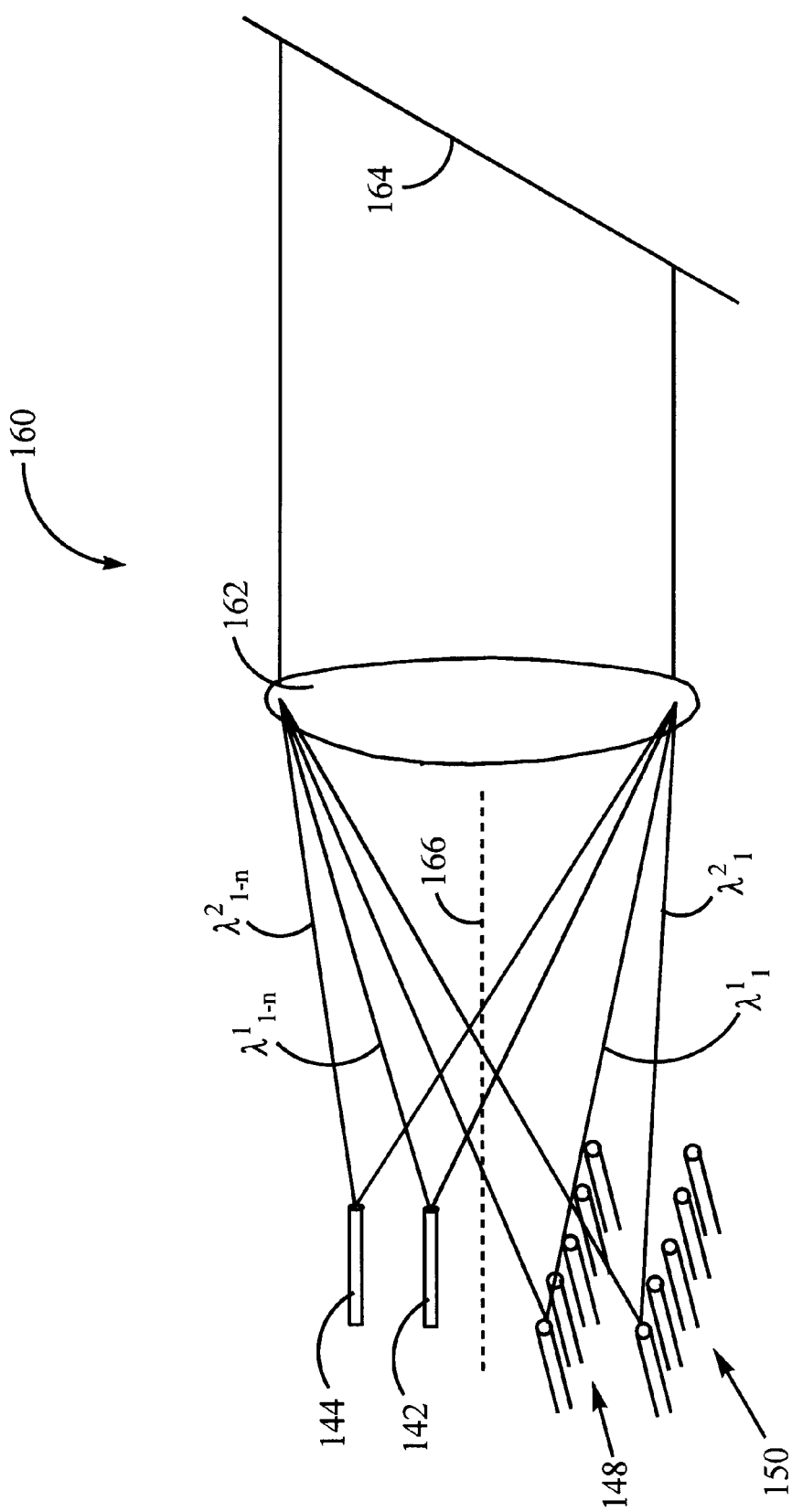
FIG. 15 is a schematic representation of a multiplexer/demultiplexer having stacked multiplex fibers and a two-dimensional array of single channel fibers.

FIG. 15 is a schematic representation of a preferred embodiment of a stacked input bulk optic echelle DWDM device 160. Input beam $\lambda^1_{1\text{-}10}$ from input fiber 142 is directed to the collimating/focusing optic 162 and a collimated beam is then directed off the reflective surface of the reflective echelle grating 164. The diffracted channels $\lambda^1_1$, $\lambda^1_2$ then return through the collimating/focusing optic 162 and are dispersed to the fibers comprising the first output row 148 as illustrated by $\lambda^1_1$. The collimating/focusing optic has an optical axis 166 and the input fiber 142 and the output row 148 are equally spaced from the optical axis 166 of the collimating/focusing optic in the vertical direction. In a like manner, a multiplexed input beam $\lambda^2_{1-n}$ is emitted from the input fiber 144 and its various channels $\lambda^2_1$, $\lambda^2_2$ are diffracted to the second horizontal output row 150. With respect to each of output rows 148 and 150, the centers of the optical fibers in the row are each spaced a distance from the centers of adjacent optical fibers in the row equal to the channel separation of the echelle grating 164 at the focal length of the focusing/collimating optic 162. The propagating ends of the output fibers as well as the propagating ends of the input fibers all lie in a plane spaced the focal length of the collimating/focusing optic from the collimating/focusing optic.

Figure 17:
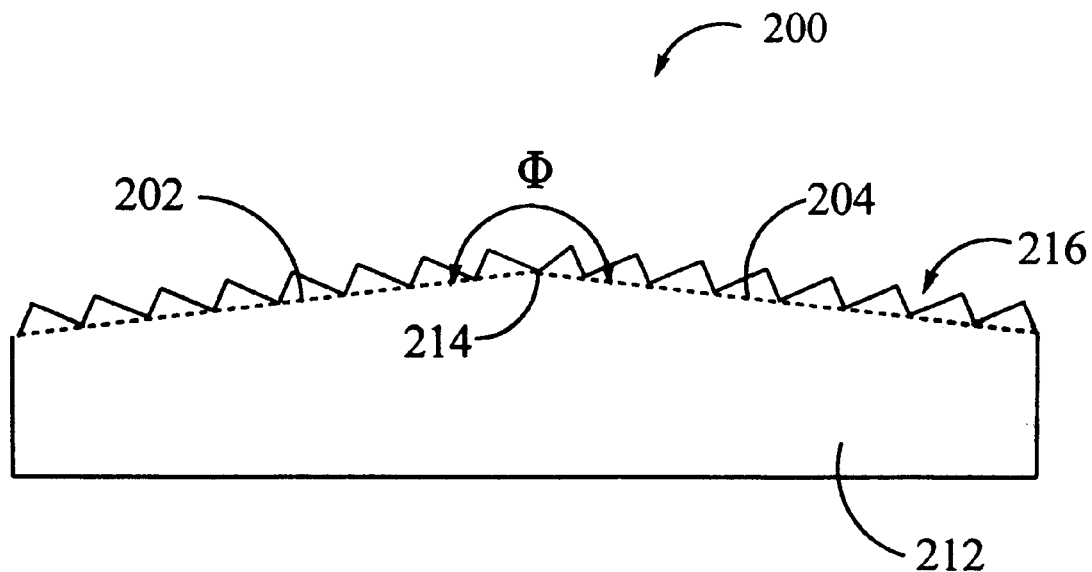
FIG. 17 is a side view of a grating for producing a flat-topped filter response.

FIG. 17 illustrates an adaptation to the diffraction grating of FIG. 4 for providing a broadened pass band or a more flat-topped filter function. As should be apparent to those skilled in the art, the adaptation is applicable to diffraction gratings other than echelles. The grating 200 of FIG. 17 is identical to the grating 20 of FIG. 4 except it is divided into two sections 202 and 204 that are angularly displaced relative to one another. The angular displacement is in fact very small, and is greatly exaggerated in FIG. 17. Assuming a configuration illustrated in FIG. 4 with a focal length of 135 mm, the total angular displacement is on the order of 10–50 arc-seconds with an angular displacement of about 15 arc-seconds believed to be preferred. The angular displacement is chosen so that with the grating incorporated in the (de)multiplexer 10 of FIG. 4, the optical signal diffracted by each section 202, 204 is offset in a direction of dispersion relative to the portions of the optical signal diffracted by the other section 202, 204. The offset is preferably on the order of 20$\mu$ at the receiving/transmitting ends of the optical fibers. Obviously the angular displacement is a function of the desired offset and focal length.

Figure 18:
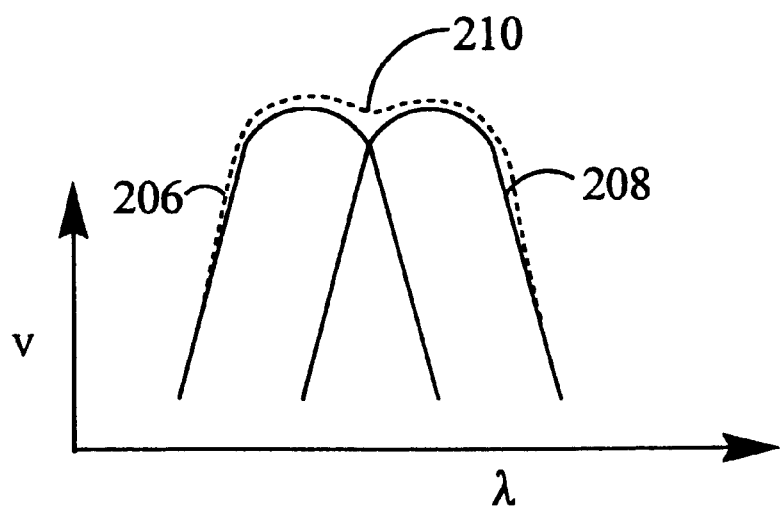
FIG. 18 illustrates the Gaussian pass-band produced by each section of the grating of FIG. 17 and the resulting flat-topped filter function.

The desired result is illustrated in FIG. 18. Each segment produces is own Gaussian function, the function 206 corresponding to section 202 and function 208 corresponding to section 204. The superposition of these two filter functions 210 approximates the desired flat-topped filter function.

In the grating 200 of FIG. 17, the first and second sections 202, 204 are preferably planar and are preferably formed in a single substrate 212. They intersect along a line of intersection 214. The angular displacement is preferably chosen so that, as illustrated, the angle $\phi$ between the sections 202, 204 is greater than 180 degrees. Parallel grooves 216 are preferably formed in the planar sections 202, 204 parallel to the line 214. This simplifies manufacture of the grating 200. The grating can be manufactured as discussed above or using holographic techniques.

The preferred embodiment described above with respect to FIG. 17 could be altered in a number of ways and still perform the function of producing a flat-topped filter function. For example, instead of being a planar grating, the grating could be convex as illustrated in FIG. 11. Or, the grooves could be transverse the line of intersection. Another alteration could be having the angle $\phi$ be less than 180 degrees. Also, the preferred embodiment illustrates only first and second sections 202, 204. It should be understood that 3 or more sections could be provided, each angularly displaced from the other, to produce 3 or more Gaussian functions to modify the superimposed function as desired. Thus, where the claims recite first and second sections, it should be understood that gratings having third, fourth and even more additional sections are within the claim scope. Further, while the single embodiment of FIG. 17 shows the first and second planar sections 202, 204 in essence inclined about a parallel axis, first, second or more planar sections could be inclined about unparallel axes as desired. While the preferred embodiment shows the grating sections formed in a single substrate, they could be formed in multiple substrates suitably supported in operative positions to achieve the same result. These examples of alterations are not intended to be limited on the scope of the invention, but merely to illustrate some of the alternatives within the scope of the invention.

Figure 19A:
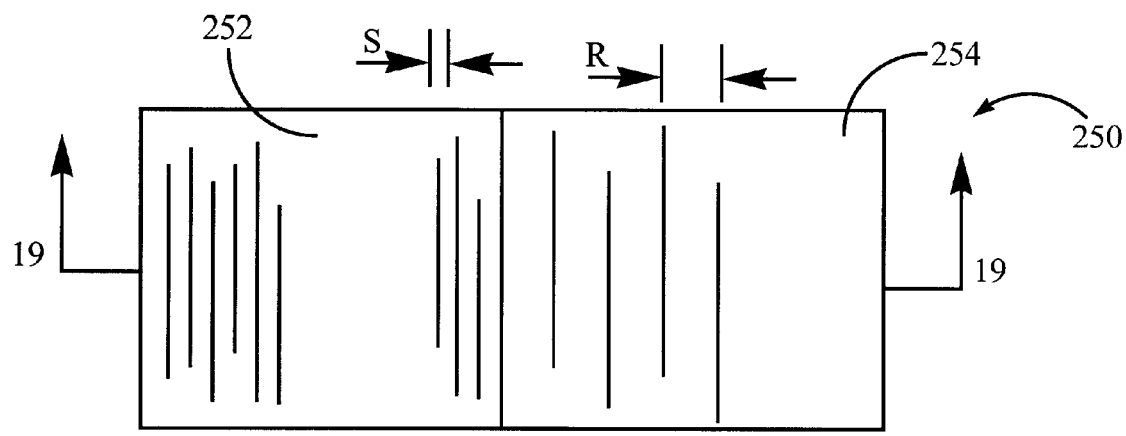
FIG. 19 is a plan view of an alternate embodiment of a grating for producing a flat-topped filter response.
Figure 19B:
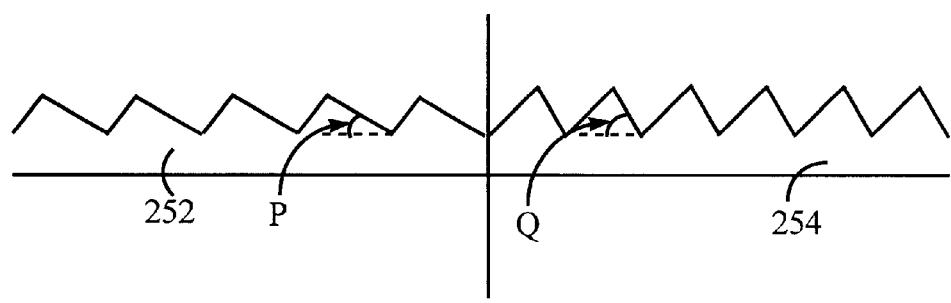

Another variation to the grating to produce a flatter bandpass is ruling the grating in two halves (side-by-side in the dispersion direction) with two slightly different blaze angles and line spacings. This is illustrated schematically in FIGS. 19A and 19B. FIG. 19A is a schematic elevation view of a bulk grating 250, again preferably an echelle grating such as that described with reference to FIG. 4. First section 252 has a line spacing S and a second section 254 has a slightly greater line spacing R. Referring to FIG. 19B, which is a schematic cross-sectional view of the grating 250 of FIG. 19A along line 19—19, first section 252 has a blaze angle P and a second section 254 has a slightly different blaze angle Q. Alternatively, only either one of the line spacing or blaze angles of segments 32, 34 could vary. More than two rulings could be used if desired. This would be accomplished during the ruling of the master grating. Once again, 20 arc-second precision will be required and the line density will need to change concomitantly by a very small amount. Such variations in the grooves could produce the filter function illustrated in FIG. 18. Typically grating manufacturers only have ~0.1 degree control over the absolute blaze angle on a grating, but it should be possible to change the blaze angle accurately by a very slight amount after ruling half of the grating using a high precision fixture. The ruling density can be controlled to almost arbitrary precision. Polarization dependent loss, resolution and efficiency concerns could make this option difficult to pursue.

Altering the grating as discussed above may not in all circumstances provide a complete solution to providing a flat-topped filter response. For OC48 operation, the bit rate is 2.5 Gbs. This corresponds to a signal bandwidth of 2.5 GHz or 0.02 nm. The spot size of the signal light at the input/output pigtail of FIG. 4 if approximately 10 microns for OC48 operation. Any change in wavelength immediately begins to compromise insertion loss as the wavelength of the light varies since the effective aperture of the fiber is also approximately 10 microns. (Note that a change in wavelength will displace the focused beam relative to the fiber core into which it is directed.) For higher bit rates (e.g. OC192 or 10 Gbs), the signal bandwidth increases to 0.08 nm. The spot size at the output pigtail of FIG. 4 increases to more than 20 microns. Off-setting the diffracted signal portions as discussed above will further increase the effective spot size and, particularly for OC48 and higher bit rates, create the potential for loss of data.

Obviously, if the core size itself is large enough in a particular (de)multiplexer, the problem might not be present. More likely, however, the increased effective spot size must be accommodated. One way to address this problem is to decrease the spot size by minimizing dispersion. For example, if possible, the receiving/transmitting ends could be moved closer to the focusing/collimating lens.

Figure 20:
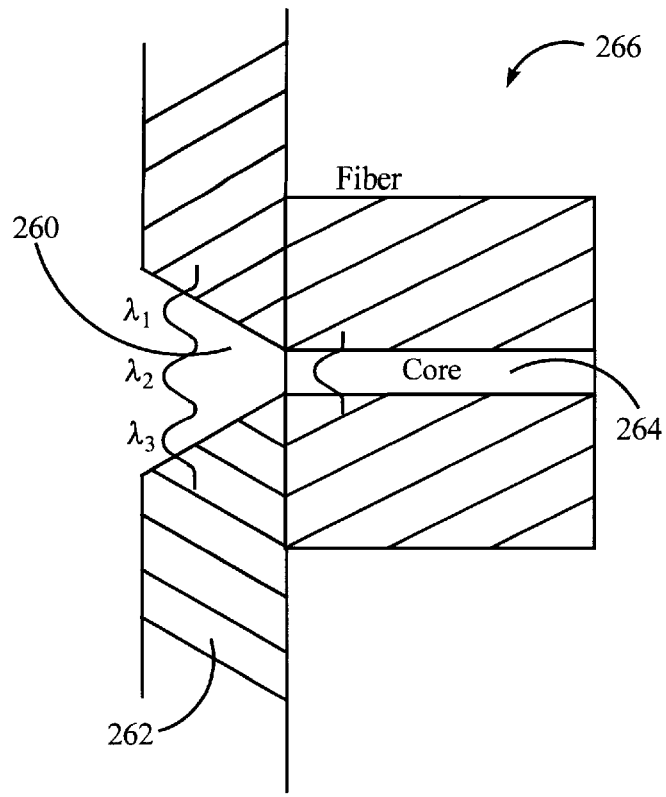
FIG. 20 is a schematic cross-section of an antenna in operative association with the receiving/transmitting end of an optical fiber.

A more promising way to address this problem is to provide a structure operatively associated with the receiving/transmitting ends of the fibers for radially expanding the effective size of the fiber core. One such structure is an antenna coupled to the core of the multiplexed and single channel fibers. This is illustrated schematically in FIG. 20. An antenna 260 formed in a substrate 262 can increase the effective size of the core 264 of a fiber 266 receiving/transmitting data by a factor of three or more. This can also help produce a flat-topped filter response, as illustrated in FIG. 20.

The antenna may be micro-machined in a variety of conducting, semi-conducting or insulating materials using either of two techniques or a combination thereof. One technique utilizes laser ablation to drill the necessary holes. The taper is achieved as shown in FIG. 20 by varying the diameter of the holes. The advantage of the laser ablation technique is that any material can be machined. Another method of fabricating the antennas is through the use of lithographic techniques on silicon with selective chemical etching. A combination of these two techniques may be used if silicon is the material that is utilized. Some configurations may require an impedance matching (index matching) device at the narrow end of the taper near the fiber to improve coupling efficiency into the fiber core. Such a device might be a GRIN lens, ball lens or appropriate waveguide step structure.

Figure 21:
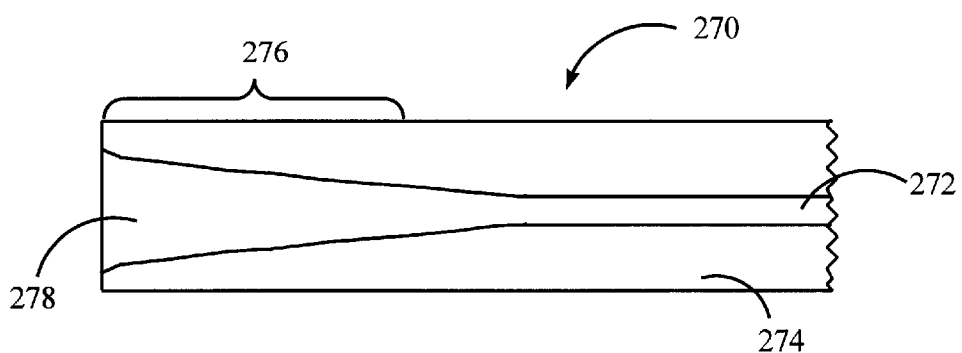
FIG. 21 is a schematic cross-section of a thermally expanded TEC fiber core.

Another potential structure is to use thermally expanded core fibers (TEC fibers) as the multiplex and single channel fibers in the fiber pigtail array that is used to capture the (de)multiplexed signal. A TEC fiber illustrated in FIG. 21 is produced from a fiber 270 having a core 272 with a first refractive index doped with a diffusing agent surrounded by a cladding 274 having a second refractive index. When a portion 276 of the fiber is heated to high temperatures (700–1400° C.) locally for a given period of time (10 minutes–5 hours), the diffusing agent diffuses into the cladding and varies the refractive index of the cladding to essentially expand the core. An exemplary diffusing agent is $GeO_2$. Prior to heating there is a step variation in the index of refraction between the cladding and the core. After heating the change in the index of refraction between the core and the cladding is more "Gaussian" in profile, which results in an expanded effective size of the core 278 and the mode field diameter of the fiber. Referring to FIG. 21, the core has an essentially adiabatic taper in the portion 276 that mimics the function of the antennas discussed above with reference to FIG. 20. The advantage of TEC fibers is that they are integral to the system unlike the antenna array that must be affixed to the fiber pigtail creating alignment issues.

As one example, the unexpanded core diameter (at 272) is about 8.2 microns and the total diameter of the cladding is between 80–125 microns. After heating, the effective core diameter (at 108) is increased to 15–24 microns, although an increase of up to 40 microns (approximately a factor of 5) is available. Provided that the length of the taper is sufficient (the length of portion 106 is about 4 mm), there is no additional loss incurred by the use of the TEC fiber; however, the numerical aperture (angular acceptance) of the fiber is slightly decreased. As a result, it is likely that increases in the core size will be limited to a factor of 2–3. TEC fibers are discussed in greater detail in Kihara and Haibara (1996) J. Lightwave Technology 14:2209–2214, and Finegan, U.K. Patent No. GB 2,219,869, each of which is incorporated by reference in its entirety.

Figure 22:
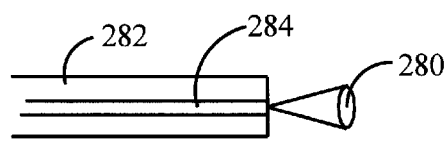
FIG. 22 is a schematic cross-section of a focusing lens operatively associated with a receiving/transmitting end of an optical fiber.

Yet another potential structure is to provide a focusing microlens in operative association with the core of each fiber. This structure is illustrated schematically in FIG. 22. Here lens 280 is placed in front of each fiber 282 with the fiber core 284 within the focal length of the lens. Such a structure is shown in Martin, U.S. Pat. No. 6,284,695, the disclosure of which is incorporated by reference in its entirety.

What is claimed is:

1. An apparatus for use in optical communications systems to multiplex or demultiplex an optical signal comprising optical channel(s) of distinct wavelength(s), the apparatus comprising:
    a multiplex optical waveguide propagating a plurality of optical channels, the multiplex optical waveguide having a receiving/transmitting end;
    a plurality of single channel optical waveguides each propagating a single channel, each single channel optical waveguide having a receiving/transmitting end; and
    a diffraction grating optically coupled between the multiplex optical waveguide and the single channel optical waveguides for diffracting an optical signal between the receiving/transmitting end of the multiplex optical waveguide and the receiving/transmitting ends of the single channel optical waveguides, the diffraction grating comprising at least two surfaces each having a plurality of grooves formed therein, each of the surfaces being angularly displaced relative to one another a select amount such that a portion of the optical signal diffracted by each surface is offset in a direction of dispersion relative to portions of the optical signal diffracted by the other surfaces.

2. The apparatus of claim 1 wherein the surfaces of the diffraction grating are planar and are formed in a single substrate.

3. The apparatus of claim 2 wherein the grating has first and second planar surfaces, the first and second planar surfaces intersecting along a line of intersection, an angle between the first and second planar surfaces about the line of intersection being greater than 180 degrees.

4. The apparatus of claim 2 wherein the grooves in each planar surface are parallel and each planar surface intersects at least one other planar surface along a line of intersection, each line of intersection being parallel to the grooves.

5. The apparatus of claim 1 wherein the angular displacement is between 10–50 arc-seconds.

6. The apparatus of claim 1 wherein the angular displacement is such that it causes the offset portions of the optical signals to broaden a transmission band at the receiving/transmitting ends of the single channel and multiplex optical waveguides.

7. The apparatus of claim 1 wherein the portions of the optical signals are offset about 20 microns at the receiving/transmitting ends of the optical waveguides.

8. The apparatus of claim 1 wherein the grating is an echelle grating.

9. The apparatus of claim 1 wherein the grating has a groove spacing of between about 50 and 300 grooves per millimeter and a blaze angle of between about 51–53 degrees.

10. The apparatus of claim 1 further comprising means operatively associated with the receiving/transmitting ends of the multiplex and the single channel optical waveguides for radially expanding an effective size of the receiving/transmitting ends.

11. A method broadening the transmission band of a (de)multiplexer used in fiber optic communications systems, the (de)multiplexer having a multiplex optical waveguide for propagating a plurality of optical channels, the multiplex optical waveguide having a receiving/transmitting end having an effective optical signal receiving size, a plurality of single channel optical waveguides each for propagating a single channel, each single channel optical waveguide having a receiving/transmitting end having an effective optical signal receiving size, and a diffraction grating optically coupled between the multiplex optical waveguide and the single channel optical waveguides for diffracting an optical signal between the receiving/transmitting end of the multiplex optical waveguide and the receiving/transmitting ends of the single channel optical waveguides, the diffraction grating having a plurality of grooves formed in a surface therein, the method comprising:

a) dividing the diffraction grating into distinct surfaces; and b) angularly displacing the surfaces relative to one another a select amount such that a portion of the optical signal diffracted by each surface is offset in a direction of dispersion relative to portions of the optical signal diffracted by each other surface.

12. The method of claim 11 wherein the grating has a plurality of parallel grooves, the method further comprising in step a), dividing the diffraction grating into distinct planar surfaces parallel to the plurality of grooves.

13. The method of claim 11 further comprising:

c) radially expanding the effective optical signal receiving size of the receiving/transmitting end of the optical waveguides.

14. A diffraction grating for use in (de)multiplexing optical signals in an optical communications system, the diffraction grating comprising at least two planar surfaces each having a plurality of parallel grooves formed therein, each of the planar surfaces being angularly displaced relative to one another.

15. The diffraction grating of claim 14 wherein the planar surfaces of the diffraction grating are formed in a single substrate.

16. The diffraction grating of claim 15 wherein the grating has a groove spacing of between about 50 and 300 grooves per millimeter and a blaze angle of between about 51–53 degrees.

17. The diffraction grating of claim 15 having first and second planar surfaces, the first and second planar surfaces intersecting along a line of intersection, an angle between the first and second planar surfaces about the line of intersection being greater than 180 degrees.

18. The diffraction grating of claim 15 wherein each planar surface intersects at least one other planar surface along a line of intersection, each line of intersection being parallel to the grooves.

19. The diffraction grating of claim 15 wherein the grating is an echelle grating.

20. The diffraction grating of claim 14 wherein the angular displacement is between 10–50 arc-seconds.

* * * * *